Aug. 29, 1939.　　A. M. ROSSMAN　　2,170,838
POWER TRANSMISSION
Filed Dec. 26, 1934　　4 Sheets-Sheet 1

INVENTOR:
ALLEN M. ROSSMAN
BY: C. T. Parker
ATTORNEY

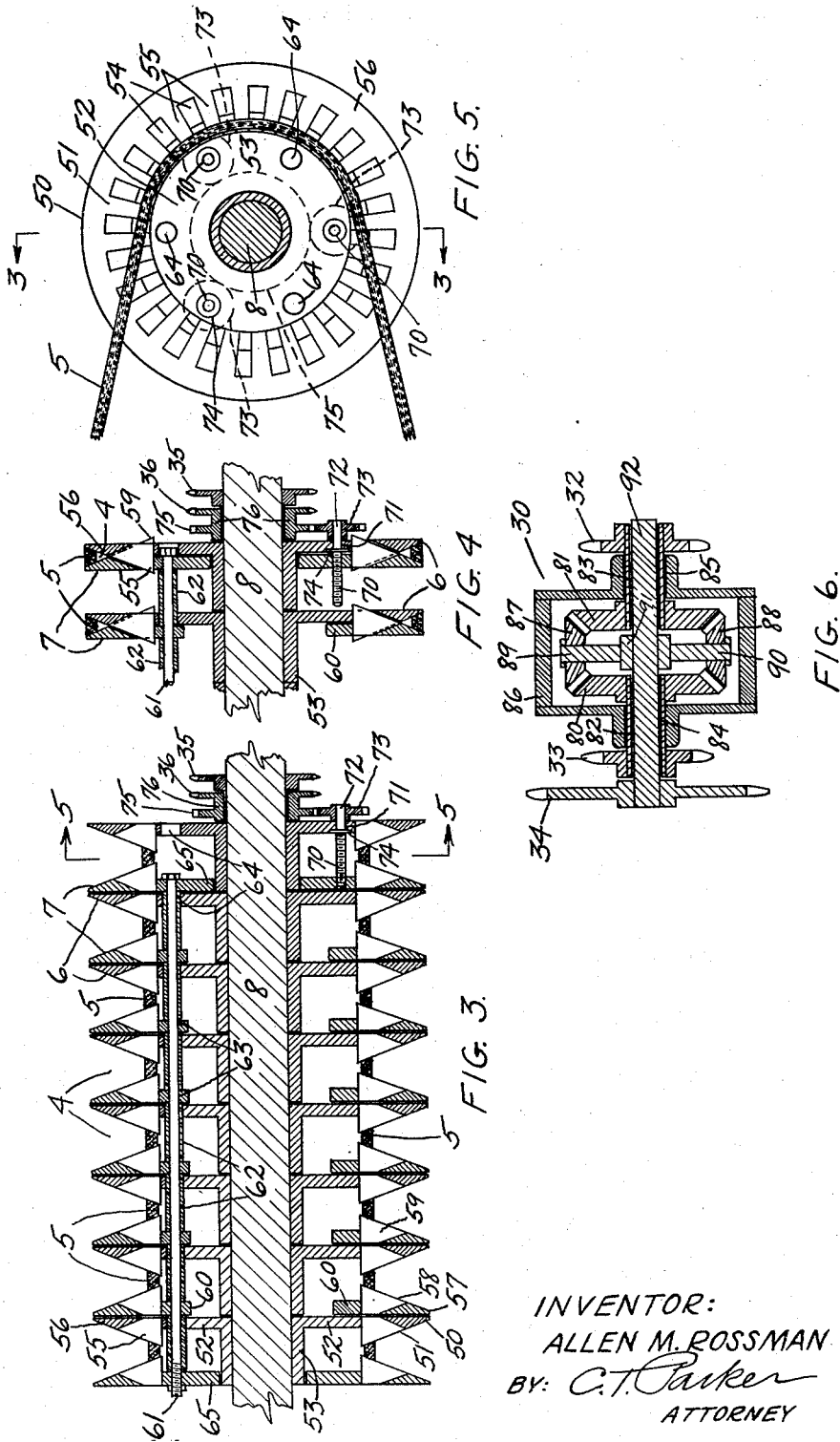

Aug. 29, 1939.    A. M. ROSSMAN    2,170,838
POWER TRANSMISSION
Filed Dec. 26, 1934    4 Sheets-Sheet 3
FIG. 7.
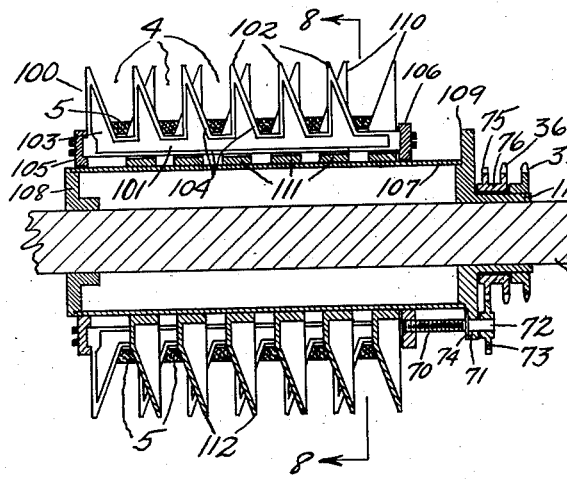
FIG. 8.
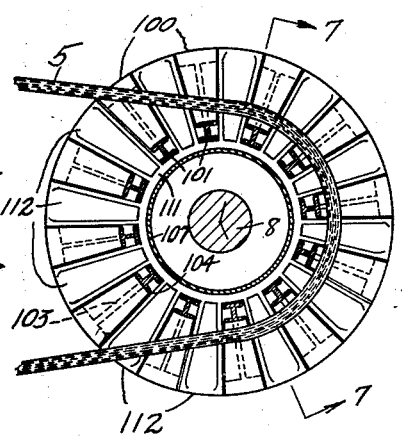
FIG. 9
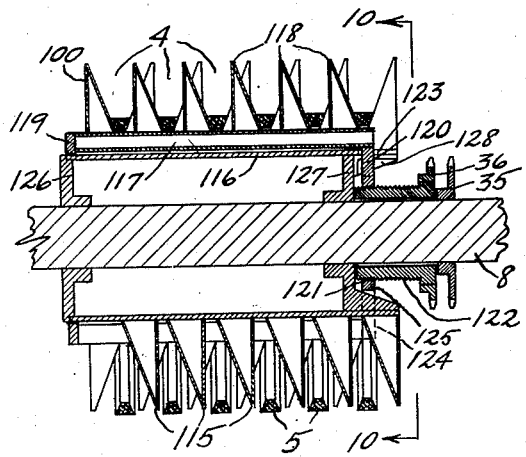
FIG. 10
INVENTOR:
ALLEN M. ROSSMAN
BY: C. T. Parker
ATTORNEY Aug. 29, 1939.  A. M. ROSSMAN  2,170,838
POWER TRANSMISSION
Filed Dec. 26, 1934  4 Sheets-Sheet 4
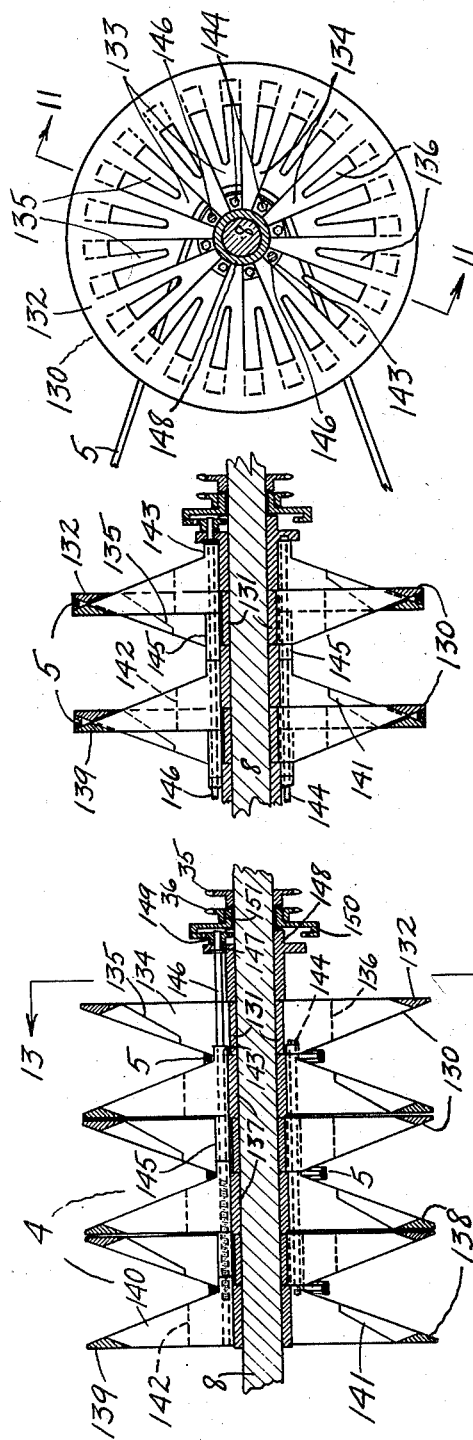
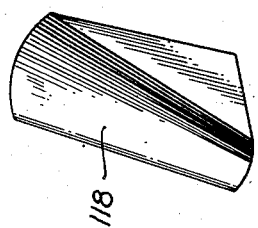
INVENTOR:
ALLEN M. ROSSMAN
BY: C. T. Parker
ATTORNEY Patented Aug. 29, 1939

2,170,838

UNITED STATES PATENT OFFICE 2,170,838

POWER TRANSMISSION

Allen M. Rossman, Wilmette, Ill.

Application December 26, 1934, Serial No. 759,249

24 Claims. (Cl. 74—230.17)

The present invention relates in general to mechanical power transmission and more particularly to a system of adjustable diameter pulleys for adjusting the speed of a driven shaft relative to that of its driving element.

Heretofore, commercial adjustable speed transmissions employing adjustable diameter pulleys have been limited by mechanical considerations to low operating speeds, thereby resulting in large, heavy, and therefore expensive pieces of machinery. For this reason, practical applications of mechanical adjustable speed transmissions have been limited to the order of 50 horse power or less. In applications requiring higher values of power, it has therefore been necessary to use adjustable speed types of motors which are in general more complicated and expensive than constant speed motors.

The general object of my invention is to provide a comparatively light, high speed mechanism having a wide variation in speed adjustment and which can be built practicably in units of higher powers than have been available in the past.

My invention employs, in its preferred form, the well-known V-belts of rubber and fabric construction, such as are used in many industrial applications at the present time. These belts usually operate in multiple on sheaves or pulleys which have grooves to receive them.

Although I am aware that attempts have been made to provide grooved pulleys in which the effective diameter of the grooves is adjustable, I believe the present invention is the first to provide a complete transmission, employing multiple V-belts, of wide speed range and high power and having means for controlling the speed ratio during operation.

It is a specific object of this invention to provide a pulley of the adjustable diameter type having a plurality of V-shaped grooves to receive V-belts, which can be assembled in various capacities with a few standardized parts.

Another object of the invention relates to the provision of a simple and novel mechanism for adjusting the effective diameter of the pulley independent of rotation.

Other objects relate to details of construction by which a maximum number of V-belts can be arranged in a given space.

Other objects will be made apparent to those skilled in the art by the following description, explanation, and drawings.

In the drawings which are appended hereto;

Figure 3 is a longitudinal section through a pulley showing one embodiment of this invention.

Figure 4 is a partial longitudinal section of the embodiment shown in Figure 3 but showing the pulley set for its maximum effective diameter.

Figure 5 is a transverse section taken along the line 5—5 of Figure 3.

Figure 6 is a sectional view of a differential gear mechanism for adjusting a pulley embodying the principles of this invention.

Figure 7 is a longitudinal section of a pulley showing another embodiment of my invention, said section being taken along the line 7—7 of Figure 8.

Figure 8 is a transverse section of the embodiment of Figure 7, taken along a line 8—8 in Figure 7.

Figure 9 is a longitudinal section of a pulley illustrating a third embodiment of my invention, said section being taken along the line 9—9 of Figure 10.

Figure 10 is a transverse section taken on a line 10—10 in Figure 9.

Figure 11 is a longitudinal section of a pulley showing a modification of the embodiment of Figure 3 in which a wider range of speed adjustment is obtainable, said section being taken along the line 11—11 of Figure 13.

Figure 12 is a partial section similar to Figure 11 but illustrating the pulley in a position providing for maximum effective diameter.

Figure 13 is a transverse section taken along a line 13—13 in Figure 11.

Figure 14 is an enlarged perspective view of one of the teeth of the pulley of Figures 9 and 10.

In the drawings, like reference numerals refer to like parts throughout.

Figure 1 is a plan view of an adjustable speed transmission 1 embodying certain principles of my invention. Figure 2 is a side elevation.

Figure 1:
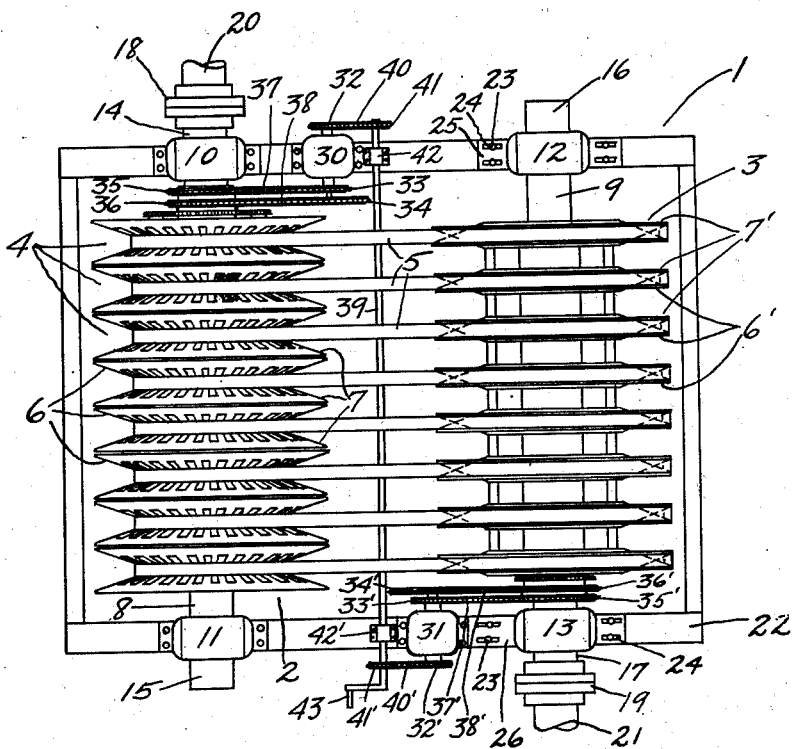
Figure 1 is a plan of an assembled adjustable speed mechanism.

The mechanism comprises a pair of adjustable pulleys 2, 3 each of which comprises an assembly of elements providing a plurality of peripherally extending V-shaped grooves 4 which are adapted to receive a plurality of endless V-belts 5 respectively, which belts operate between corresponding grooves of the two pulleys 2, 3.

The pulley elements on each pulley are divided into two sets 6, 7, each set providing one surface of each groove. Each set of elements is secured into a rigid unitary structure and means, to be described later, are provided to effect relative movement between the two sets in a direction parallel to the axis of the pulley. The two sets of elements cooperate to provide a plurality of opposing cone-shaped surfaces which, when moved axially with respect to each other, produce an increase or a decrease in the effective diameter of the peripheral grooves.

Each of the pulley assemblies 2, 3 includes a shaft 8, 9 respectively, on which the elements are mounted. Each of the shafts 8, 9 is supported rotatably in bearings 10, 11, 12, 13, one bearing at each end of each shaft. The shafts extend through the bearings to extensions 14, 15, 16, 17 respectively, which are adapted to receive couplings 18, 19. By means of the couplings, the pulley shafts 8, 9 are coupled to the motor shaft 20 and the load shaft 21 respectively. The transmission mechanism is symmetrical and reversible, however, therefore either shaft extension of one pulley can be coupled to the load shaft and the motor shaft can then be coupled to either extension of the other pulley.

The shaft bearings 10, 11, 12, 13 are supported on a frame or base 22. One pair of bearings 10, 11 is bolted rigidly to the frame, while the other pair 12, 13 is adjustably bolted on the frame by bolts 23 which pass through slots 24 in the bearing supports 25, 26. By loosening these bolts, the pulley 3 can be moved toward or away from the other pulley 2, thereby adjusting the tension in the belts 5.

Associated with each pulley is a differential mechanism 30, 31 respectively, mounted on the frame 22. These mechanisms will be explained in detail later but at this point it is sufficient to state that each mechanism consists of three differentially connected components which are connected to three sprocket wheels, 32, 33, 34 respectively.

Relative axial movement between the two sets of pulley elements 6, 7 is accomplished, as will be later described, by relative rotation of a pair of control wheels or sprockets 35, 36 mounted on the shafts 8, 9 respectively. These sprockets 35, 36 are connected to two sprockets 33, 34 respectively on the differential mechanism 30, by driving chains 37, 38, while the control sprockets 35', 36' of the second pulley 3 are connected respectively to the sprockets 33', 34' of the differential 31 by chains 37', 38'.

With the pulley set in adjusted position, the two control wheels 35, 36 rotate with the shaft and at the same speed, thereby driving the differential by means of the chain drives 37, 38. As will be shown later, the differential mechanism is adapted so that when the two control wheels 35, 36 are running at the same speed, there being no relative rotation between them, the third component of the mechanism connected to the adjusting sprocket 32 is stationary.

Hence, by rotating the third sprocket 32, a relative movement of the control wheels 35, 36 on the shaft 8 is produced, resulting in a relative axial movement of the two sets of pulley elements 6, 7, and therefore a change in the effective diameter of the pulley.

By simultaneously increasing the effective diameter of one pulley and decreasing the effective diameter of the other pulley, both at the same rate of change, the length of the path, or circuit, of the belt around the pulleys does not change appreciably and hence the tension of the belt remains substantially constant. This is accomplished by connecting the adjusting sprockets 32, 32' of the respective differential mechanisms 30, 31 to a common control rod 39 by means of chains 40, 40' driving through sprockets 41, 41' on the rod 39. The rod 39 is mounted in bearings 42, 42' supported on the frame 22 and crosses the frame 22 between the pulleys 2, 3, although the location of the rod is immaterial as long as it is connected to both control sprockets 32, 32'. Simultaneous equal changes in the effective diameter of the pulleys and in opposite directions of change are effected by rotating the rod 39 by means of a handle 43 attached to the rod, thereby adjusting the speed of the load or driven shaft with respect to that of the motor or driving shaft. Adjustments can thus be made independent of rotation of the pulleys.

In order to provide for adjusting the tension of the belt without disturbing the control chains 37', 38', the mechanism 31, associated with the pulley 3 which can be moved on the frame 22, is mounted on an extension of the base 26 of the bearing support 13, and hence slides with the pulley. To compensate for changes in distance between the rod 39 and the adjusting sprocket 32', the control chain 40' is provided with slack which is taken up by an idler sprocket 44 mounted on an arm 45, pivoted to the frame of the differential 31.

Referring now to Figures 3 to 5, Figure 3 is a longitudinal section of an adjustable diameter pulley showing one embodiment of my invention. Figure 5 is a transverse section taken along a line 5—5 in Figure 3. These drawings illustrate the pulley as set for the minimum effective diameter of the V-belt grooves 5.

Figure 4 is a partial sectional view showing the relative positions of the various parts of the pulley when it is set for its maximum effective diameter.

The pulley comprises a plurality of elements which are divided into two sets or groups. One set 6 is mounted on and fixed to the shaft 8, while the other set 7 is axially movable; that is, movable in a direction parallel to the axis of the shaft.

Each stationary element consists of an annular conical portion 50 having a conical surface or pulley face 51. This annular portion is carried on a web 52 which is mounted on a flange 53. The flange 53 is adapted to be pressed on or keyed to the shaft 8 to prevent relative movement therewith. The length of the flange is determined by the spacing between elements, the flange thus acting as a spacer, making the aligning of the elements axially on the shaft merely a matter of pressing them tightly together.

Radially extending slots 54 are provided in the annular conical portion which form teeth 55 between the slots. In this embodiment the slots 54 do not extend to the outer periphery of the element but only part way thereto, leaving a solid ring 56 for bracing the teeth.

The other set of elements 7 are similar to the first set of elements 6 in that they consist of an annular conical portion 57 which provides a conical surface or pulley face 58, the annular portion 57 also having a plurality of alternate slots and teeth 59. The annular portion is carried on a web 60.

The movable elements 7 are secured into a unitary rigid structure by means of through bolts, one of which 61 is shown in Figure 3. Tubular spacing pieces 62 are disposed on the bolt 61 between adjacent elements. The bolts pass through holes 63 in the webs 60 of the movable elements 7, fitting snugly therein, and through larger holes 64 in the webs 52 of the stationary elements 6. The latter holes 64 are sufficiently large to receive the tubular spacing pieces 62 and provide bearings for the spacing pieces to slide therethrough. Hence, the movable elements are supported on these bolts 61 by the bearings in these web holes 64 of the stationary elements.

Several of these bolts 61 are provided, in this instance three, and are distributed around the web. They are tightened firmly to secure the set of elements 7 into a rigid structure.

These bolts may be said to interlace the movable and stationary structures, thereby preventing relative rotation on the shaft but providing for relative axial movement of the two sets of elements.

Extensions 65 of the webs on the two end elements of the movable structure 7 provide bearing supports to relieve the ends of the bolts 61 from cantilever strains. The web extensions bear on the outer surfaces of the flanges 53. Extensions could, of course, be provided on the webs of all of the movable elements 7 if desired.

A V-shaped groove 4 is provided for each V-belt 5 by co-operation of a stationary element with a movable element. The conical surface or face 51 of a stationary element forms one side of the peripherally extending groove, and the face 58 of the corresponding element forms the other side of the groove, the two conical portions 50, 57 being coaxial and in opposition to each other.

The teeth 55, 59 of each element are adapted to register with and to slide into and out of the respective slots in the other element, in this way providing a further interlacing of the two sets of elements and resulting in a much wider range of adjustment of the effective diameter and effective peripheral length of each groove than would otherwise be obtained.

Figure 4 shows the manner in which the teeth and slots slide together to give the maximum effective diameter of the pulley. The angle between the two faces of the pulley is substantially equal to the angle between the sides of the V-belt, and this angle between the two conical surfaces remains constant in all adjusted positions of the pulley, the belt moving radially out or in as the sides of the pulley are moved together or apart respectively.

As the movable elements are secured in a unitary rigid structure, all of the grooves of a pulley are always set for the same effective diameter in any adjusted position.

The two pulleys in a transmission unit I must be so disposed that the central planes of corresponding grooves are coincident in all adjusted positions. This is accomplished by locating the two pulleys so that the movable elements 7 are moved in the same axial direction simultaneously and at the same rate. As the effective diameter of one pulley increases and that of the other decreases, the belts will then shift axially but will remain parallel and in alignment with the grooves in all adjusted positions.

In the arrangement shown in Figure 1, the two pulleys 2, 3 are of identical construction and are positioned with the operating mechanisms at opposite sides of the frame 22. This arrangement provides for maintaining the corresponding grooves of the pulleys in alignment.

The movable elements 7 are moved or operated by means of one or more threaded members 70, in this case threaded rods or bolts, which engage co-operative threads in the unitary structure 7 of movable elements. As shown, the bolts engage the web of the element at one end of the movable structure.

The bolt 70 is rotatably supported in a bearing 71 in the web 52 of the end stationary element 6, and extends through the web to an extension 72 on which is mounted a gear 73. Hence, by rotation of the gear, the bolt is rotated and by co-operation of the threads, the entire rigid unitary structure, composed of movable conical pulley elements 7 is moved axially in one direction or the other.

A shoulder or flange 74 on the bolt 70 on one side of the web and the gear 73 on the other side prevent axial movement of the bolt.

A gear 75 coaxially disposed on the shaft 8 meshes with the gears 73 on the bolts 70, thereby providing for simultaneous adjustments of the several bolts to insure proper co-operation between them.

Although Figure 5 indicates three adjusting bolts 70 and three securing bolts 61 symmetrically spaced, this number can be varied.

The coaxial gear 75 is mounted on a collar 76 which is rotatably disposed on the shaft 8. On this collar 76 is also fixed the control wheel 36 which has been referred to. This control wheel can be a gear or sprocket, in the present case, a sprocket.

A second control wheel 35, which in this embodiment is also a sprocket wheel, is mounted on and fixed to the shaft 8.

The rotatable collar 76 is prevented from moving axially by the flange 53 on one side and by the hub of the sprocket wheel 35 on the other side.

It is now evident that a relative movement between the rotatable sprocket 36 and the fixed sprocket 35 will cause a rotation of the gear 75, hence, a rotation of the gear 73 and the threaded bolt or rod 70, and therefore an axial movement of the movable structure 7. Conversely, as long as there is no relative movement between the sprockets, regardless of any rotation of both in unison with the shaft, the effective diameter of the pulley will remain fixed.

Figure 4 illustrates the relative positions of the threaded member 70 and the movable element 7 after it has moved to the other extreme position.

Figure 2:
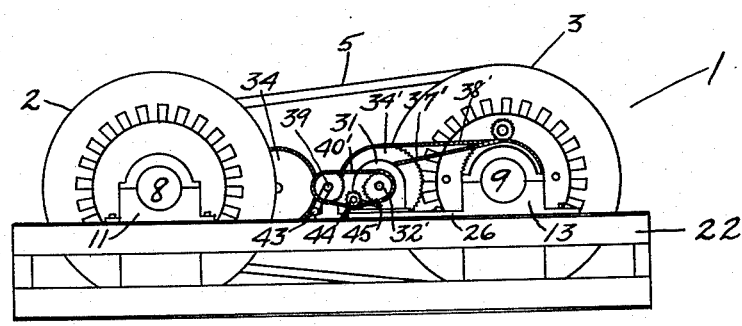
Figure 2 is a side elevation of the assembly shown in Figure 1.

Figure 6 is a section through the differential mechanism 30 or 31, referred to in Figures 1 and 2. The mechanism consists of three differentially connected components. Two of the components comprise bevel gears 80, 81 which are disposed coaxially and opposite to each other. These gears are mounted on quills or hollow shafts 82, 83 respectively, the hollow shafts being rotatably supported in bearings 84, 85 respectively in the casing 86.

Meshing with both gears 80, 81 are a pair of bevel pinions 87, 88 which are rotatably mounted on spindles 89, 90 respectively. The spindles are fixed to a collar 91, which is fixed to a central shaft 92. The central shaft is rotatable within the hollow shafts 82, 83. This assembly comprising pinions, spindles, collar, and shaft, constitutes the other component of the differential mechanism.

One sprocket wheel 34 is fixed on an end of the central shaft 92, a second sprocket 33 is fixed to an end of one hollow shaft 82, and a third sprocket 32 is fixed to the other hollow shaft 83.

In a differential or 3-way gear of this type, one of the three components can be held stationary while the other two are rotated, but rotation of the first named component adds to, or subtracts from the relative rotation between the two latter components. For instance, the central shaft 92 can be held stationary while the two bevel gears 80, 81 can rotate at the same speed but in opposite directions, the pinions 87, 88 idling on their spindles 89, 90. However, if the speed of one of the bevel gears 80, 81 be held constant, the speed of the other can be added to or subtracted from by rotating the central shaft 92, in which case the pinions 87, 88 not only rotate on their spindles, but they travel in an orbital or planetary rotation around the central axis.

Instead of holding the central shaft stationary, either of the bevel gears can be held stationary, in which case the other bevel gear and the central shaft can turn in the same direction, but the shaft turns at half the speed of the bevel gear.

I prefer to use the last described mode of operation in this embodiment of my invention. The sprocket wheel 34 is therefore connected by a chain 38 (Figure 1) to the sprocket 36, and the sprocket 33 is connected by a chain 37 to the sprocket 35.

The sprocket 36, which is rotatable on the shaft 8, thus drives the central shaft 92 when the pulley shaft 8 revolves, and moves the pinions in their orbit, while the sprocket 35, which is rigid on the shaft 8, drives one of the bevel gears 80. By making the sprocket 34 on the central shaft 92 twice the diameter of the sprocket 33 on the hollow shaft 82, and the control sprockets 35, 36 equal in diameter, the planetary rotation is thus at half the speed of that of the bevel gear 80 and the other bevel gear 81 is therefore normally stationary.

By revolving the adjusting sprocket 32, the gear 81 is rotated, which causes a change in the relative speed between the other two components, the bevel gear 80 and the shaft 92. This effects a relative movement between the two control sprocket wheels 35, 36, causing an adjustment to be made in the effective diameter of the pulley, as was heretofore explained. By turning the adjusting sprocket 32 in one direction of rotation, the diameter can be increased, and in the other direction it can be decreased.

In Figure 1, a rotation of the rod 39 by the crank 43 causes opposite relative movements of the adjusting sprockets 32, 32', therefore one of the pulleys is increased in diameter as the other is decreased and vice versa.

I wish to point out that, neglecting friction, the forces set up by the pressure of the belts in the grooves of the two pulleys and transmitted back through the adjusting mechanisms, have a tendency to rotate the adjusting sprockets 32, 32' but these sprockets are so connected to the control rod 39 that they are in opposition to each other, therefore the forces are balanced in this mechanism. Hence, when the crank 43 is turned to effect an adjustment in the pulley ratio, frictional resistances are the only forces to be overcome.

A second method of adjusting the tension of the belt is by disconnecting one of the chains 40, which connects the differential mechanisms to the common control rod 39, and slightly increasing the effective diameter of one of the pulleys and then reconnecting the chain. This can be quickly done when there is no opportunity to use the longer method of loosening the bolts 23 and setting the pulley back. This method of adjusting belt tension has the disadvantage of slightly narrowing the range of adjustment of the pulleys.

Figures 7 and 8 illustrate another embodiment of the present invention, Figure 7 being a longitudinal section through a pulley and Figure 8 a transverse section taken along a line 8—8 in Figure 7.

In this embodiment, the peripheral grooves 4 for receiving the belts 5 are provided by the co-operation of two sets of conical pulley elements, but each of the movable elements consists of a longitudinal row of teeth instead of an annular assembly of radial teeth.

The upper half of Figure 7 shows one of the elements 100, of which the movable unitary structure is composed. It is a longitudinally extending member consisting of a supporting beam 101 and a plurality of teeth 102 carried by and disposed in spaced relation along the beam. Each tooth 102 on the element 100 engages a different belt 5 in this embodiment in contrast to the previously described embodiment in which but two elements formed one peripheral groove. Hence, in the present embodiment, on every movable element one tooth is required for every V-belt for which the pulley is adapted.

The longitudinal elements 100 are all identical and each one can be cast integrally. To reduce the weight I have shown the element 100 as having a reduced body section or web 103 and a flange 104 for reinforcement and to provide a flat surface on the sloping side of each tooth to engage the belt.

The movable elements 100 are secured into a rigid cylindrical unitary structure by a pair of annular bracing members or supporting rings 105, 106, which retain the elements aligned axially with the teeth extending radially outward. The corresponding teeth on the several longitudinal elements are aligned peripherally to provide one side of each of the grooves. Figure 8 shows a total of twelve longitudinal elements 100 in the movable structure, although a greater or fewer number might be used.

The elements are supported by the annular members 105, 106, which are slidable on a cylindrical or tubular member 107, which is disposed coaxially around the shaft 8. This member 107 is supported by a pair of flanged supports 108, 109 which are fixed on the shaft 8.

The fixed conical-pulley elements 110 each comprise a supporting ring 111 fixed in spaced relation on the tubular member 107, and a plurality of radial teeth 112 extending outwardly from and supported by the ring. Radially extending slots between the teeth of the respective pulley elements 110 are disposed in axial alignment to receive the longitudinal conical-pulley elements 100.

The fixed elements 110 are all identical and can be cast with hollow teeth to reduce the weight, as indicated.

The movable unitary structure therefore is interleaved or interlaced with the stationary elements, preventing relative rotation but permitting axial movement of the elements in the aligned slots of the fixed elements. Threaded members comprising bolts 70, spaced as in Figure 5, engage one of the bracing rings 106 for moving it axially. The bolt is operated by a gear 73 driven by a gear 75 disposed coaxially of the shaft 8, as heretofore described in connection with Figure 3. In this case, however, the rotatable gear member 76 and the fixed sprocket 35 are mounted on an extended flange 113 on the support 109 instead of directly on the shaft 8. This construction, although not essential, is desirable from the standpoint of ease of assembly.

This type of pulley is also controlled by the differential mechanism 30 shown in Figure 6.

An advantage of the embodiment of Figures 7 and 8 over that shown in Figures 3 to 5 is that it requires less axial space. The belts 5 can be spaced more closely together because the teeth of adjacent grooves can overlap when the pulley is set for the minimum as well as when set for the maximum effective diameter. As can be seen in Figure 3, the teeth of adjacent grooves of that type of pulley cannot overlap when the pulley is set for its minimum effective diameter and therefore each pair of elements requires a separate and independent space in which to operate. In Figure 7, however, a tooth of one groove can move back nearly to the belt in the adjacent groove, the only limitation being that it shall not interfere with the belt itself. This is an important advantage of this embodiment and of the one shown in Figures 9 and 10, a description of which follows.

Figures 9 and 10 illustrate a third embodiment of the present invention, Figure 9 being a longitudinal section through an adjustable diameter pulley and Figure 10 a transverse section taken along a line 10—10 in Figure 9. The section in Figure 9 is taken along a line as 9—9 in Figure 10.

This embodiment is similar to the one previously described in that the movable elements 100 are longitudinally extending members while the stationary teeth 115 are aligned axially to provide aligned slots between them for receiving the longitudinal elements 100. This embodiment also discloses a pulley which instead of being composed of cast elements, is fabricated of wrought metal.

The stationary teeth 115 are formed by bending sheet metal blanks into the proper form and are welded directly to the tubular supporting member 116. The teeth are properly aligned and spaced, both axially and peripherally to form a slotted conical pulley face for one side of each of the belt grooves 4.

The longitudinal elements 100 each consist of a tubular beam 117 of trapezoidal cross section, the sides lying on radii extending from the axis of the pulley. The teeth 118 are similarly formed from sheet metal blanks and are fastened or welded to the tubular beam 117. They are properly spaced to co-operate with the stationary teeth 115 to provide grooves 4 for the belts 5.

The several longitudinal elements 100 are secured together in a rigid cylindrical unitary structure by an annular supporting member 119 holding one end of each of the beams 117 and a disc-shaped support 120 at the other end of the elements. The annular member 119 is supported and slidable on cylindrical member 116, while the disc-shaped support 120 has an opening co-axial with the shaft 8, the edge 121 of the opening being threaded to co-operate with a threaded collar 122 which is disposed rotatably on the shaft 8 and on which the support 120 is supported.

Although the supporting beams 117 could be extended beyond the last stationary tooth as in Figure 7, in this embodiment the pulley is shortened to conserve space by providing slots 123 at the end of the cylindrical supporting member 116 between the stationary teeth 115. The disc shaped support 120 is also slotted to enable it to move into the slots 123. It therefore supports the several longitudinal pulley elements 100 on the ends of radially extending fingers 124 which are tied together by an annular portion 125.

The cylindrical supporting member 116 is supported coaxial with the shaft 8 by a pair of flanged supports 126, 127 fixed to the shaft. The slotted end of the cylindrical member 116 is braced by diagonal braces 128 fastened to the flanged support 127.

Adjustments of the effective diameter are made by rotating the threaded collar 122 on the shaft 8, thereby screwing the threaded disc shaped support 120 axially to move the unitary movable structure with respect to the stationary teeth. The collar is rotated by means of a control sprocket wheel 36 which is adjustable by means of a differential mechanism 30 of the type described. The sprocket 36 is mounted on the collar 122 at one end thereof. The collar is prevented from moving axially on the shaft 8 by the support 127 at one end and by the fixed sprocket 35 at the other.

Figures 11 to 13 show a modification of the embodiment of Figures 3 to 5, in which a much wider range of adjustment is provided. The proportions of the pulley shown in Figures 11 to 13 provide a range of speed adjustment of a transmission unit approximately 12½ to 1 as compared to a range of about 2¼ to 1 in the previously described embodiments.

Figure 11 is a longitudinal section through a pulley; Figure 12 is a partial section showing the pulley set for maximum effective diameter; and Figure 13 is a transverse section taken along a line 13—13 in Figure 11.

Each stationary conical element 130 consists of an inner supporting ring 131 mounted and fixed on the shaft 8, an outer reinforcing and bracing ring 132, and a plurality of radial slots 133 extending from the inner ring to the outer ring and providing radial teeth 134 between the slots.

Because of the great length of each slot and the great difference in diameters of the shaft 8 and the outer circumference of the elements it is desirable to provide alternate long and short teeth, hence a short tooth 135 is provided extending inwardly from the outer ring 132 into each of the slots 133. These short teeth fill the wide gaps which the belts would otherwise have to span.

Furthermore, in each of the teeth 134 are provided short or partial slots 136 extending inwardly from the outer ring 132 and which are similar in shape to the short teeth 135.

The fixed conical elements 130 are spaced apart on the shaft 8 by means of spacing collars 137 which also act as bearing supports for the movable conical elements 138.

Each movable conical element 138 has an outer bracing ring 139 and a plurality of inwardly extending radial slots which provide teeth 140 between the slots, similar to those described in connection with the fixed elements. The movable elements 138 are adapted to co-operate with the fixed elements 130 to form peripherally extending grooves 4 for receiving V-belts 5 as heretofore described. The teeth 140 of the movable elements are adapted to slide into the slots 136 of the stationary elements and the teeth 134 of the stationary elements are likewise adapted to slide into the slots of the fixed elements.

Short teeth 141 are provided in the movable elements similar to those 135 in the stationary elements. They are adapted to slide into and out of the short slots 136, and similar short slots 142 are provided to receive the short teeth 135 in the stationary element 130.

In the movable elements there are no inner supporting rings to which the teeth are fixed. The teeth 140 slide on their inner ends, bearing on the spacing rings 137 which are slightly thicker than the supporting rings 131 of the stationary elements. By this construction the teeth do not slide on the rings 131, thereby eliminating difficult machining between the teeth 134. A short projection 143 on the end of each tooth 140 insures that the tooth bears on at least one of the spacing rings at all points in its range of travel.

The movable elements 138 are secured into a rigid unitary structure by means of through bolts 144 which pass through the ends of the teeth. With spacing pieces 145 on the bolts between elements, the bolts can be drawn up firmly thereby securing the elements together.

In two or more of the teeth are threaded rods 146 which are threaded into at least one of the elements in the structure and which are rotatably mounted in bearings 147 in a flanged supporting member 148 on the shaft 8. By rotating these rods about their own axes, the unitary movable structure is moved axially to change the effective diameter of the pulley.

The rods 147 are rotated by means of gears 149 on the ends of the respective rods. These gears are operated by means of an internal gear 150 which meshes with the gears 149. An internal gear is used here instead of an external gear because there is insufficient space for a gear between the shaft 8 and the gear 149.

The internal gear is supported on a member 151 which is rotatable on the shaft. A sprocket or control wheel 36 is fixed on the member 151. The method of controlling this mechanism is the same as has been described heretofore and need not be repeated.

In this specification and in the claims which follow, I have used the term "conical-pulley elements" to define the parts which combine to form one or more pairs of opposed conical pulleys which co-operate to provide V-shaped peripheral grooves. This includes both the frusto-conical shaped coaxial disc-like members in certain of the embodiments, as well as the longitudinal elements which combine in assembly to form a plurality of cone shaped slotted surfaces in other embodiments.

I recognize, however, that as the V-belts must span the slots between the teeth, there would be stresses concentrated in the belts at the edges of each tooth if the faces of the teeth lay exactly in the conical surface. I therefore contemplate slightly rounding the face of each tooth, as illustrated in Figure 14, to relieve these stresses and it is understood that this change shall not exclude a structure from coming under the above definition.

I do not intend to be limited to the details shown and described herein except as set forth in the following claims.

I claim:

1. A shaft, an adjustable pulley comprising a plurality of conical elements disposed on said shaft, and co-axial therewith, each of said elements having a plurality of radially extending slots and teeth between said slots, the respective slots of said elements being in alignment, longitudinally extending members slidably disposed respectively in said aligned slots, said members each having a row of spaced teeth, means for securing said members into a unitary rigid structure to form slotted conical surfaces co-operative respectively with said conical elements to provide peripherally extending V-shaped grooves, and means for sliding said structure axially with respect to said conical elements to change the effective peripheral length of said grooves.

2. A shaft, an adjustable pulley comprising a tubular member supported on and coaxial with said shaft, a plurality of conical elements mounted in spaced relation on said tubular member, each of said elements having a plurality of radially extending slots, the corresponding slots of the respective elements being aligned parallel to the axis of the shaft, a longitudinal member extending through each line of slots, each of said longitudinal members having a row of teeth, said teeth being spaced to conform with the spacings of said conical elements, a pair of supporting rings fixed respectively to the corresponding ends of each of the longitudinal members, said rings being movably supported on said tubular member.

3. An adjustable pulley of the class described, comprising, a pair of cylindrical structures one within the other, the outer cylindrical structure comprising a plurality of longitudinal members spaced circumferentially of one another, each member comprising a supporting beam and a plurality of teeth disposed in spaced relation along the beam, means comprising at least one annular bracing member fixed to said longitudinal members, for securing said members, and the inner structure having spaced teeth projecting through the spaces between the longitudinal members of the outer structure.

4. In an adjustable pulley of the class described, a cylindrical structure comprising a plurality of longitudinal members, each member comprising a supporting beam and a plurality of teeth the bases of which are disposed in spaced relation along the beam, said longitudinal members being held together by at least one annular bracing member, the teeth extending radially with respect to the principal axis of said cylindrical structure, one side of each of said teeth sloping at an obtuse angle to said beam, and corresponding teeth of said longitudinal members being in alignment, so that the sloping sides of said aligned teeth provide a plurality of coaxial slotted conical surfaces.

5. An adjustable pulley of the class described, which includes a plurality of longitudinal members, each of which includes a supporting beam with a row of teeth cast integrally thereon and with the bases of the teeth spaced from one another longitudinally of the beam.

6. In an adjustable pulley of the class described, a longitudinally sliding member comprising a substantially rectangular beam and a row of teeth disposed on and supported by said beam, with the bases of the teeth spaced from one another on the beam.

7. In an adjustable pulley of the class described, a longitudinal member comprising a fabricated beam and a plurality of fabricated sheet metal teeth fastened to said beam with the bases of the teeth in spaced relation along said beam.

8. A shaft, an adjustable pulley of the class described mounted coaxially on said shaft, said pulley including a rigid movable cylindrical structure comprising a plurality of longitudinally disposed beams, each beam supporting a row of fabricated sheet metal teeth fastened thereto with the bases of adjacent teeth spaced from one another, said beams being disposed parallel to and equidistant from a central axis, said teeth extending radially of said axis, annular bracing means for securing and supporting said structure, and means engaging said annular bracing means, for moving said structure axially on said shaft.

9. A shaft, an adjustable pulley of the class described, including a cylindrical supporting member mounted on said shaft and coaxial thereto, and a plurality of radially extending teeth fastened to the outside of said cylindrical member with adjacent teeth spaced apart at their bases, and with the teeth in both peripheral alignment and axial or longitudinal alignment and extending radially outwardly therefrom, said teeth each having a sloping side, thereby forming a plurality of substantially conical slotted surfaces.

10. A power transmission device which includes a rotatable shaft, a plurality of conical elements mounted on said shaft, each of said elements having a plurality of radially extending slots forming radially extending teeth between the slots, corresponding slots in the several elements being in alignment in a direction parallel to said shaft, a plurality of movable longitudinal members disposed respectively in said axially aligned slots and secured by annular bracing members at opposite ends thereof, each of said longitudinal members comprising a row of teeth fixed to a supporting beam, said last named teeth co-operating with said first named teeth to provide a plurality of V-shaped peripherally extending grooves, and means for moving said longitudinal members in their respective slots thereby increasing or decreasing the effective peripheral lengths of said grooves.

11. A shaft, an adjustable pulley of the class described, comprising a first set of conical elements mounted on said shaft, said elements having a plurality of radially extending slots and teeth between said slots, a second set of conical elements disposed on said shaft and co-operative with said first set, each element of said second set comprising an outer supporting ring, a plurality of teeth extending radially inward from and fastened to said ring, and radially extending slots between the teeth, said last named elements being axially movable with respect to the first set of elements and bearing on the inner ends of said teeth, and through bolts for securing said second set of elements into a rigid unitary structure, said bolts passing through certain of the corresponding teeth of said respective elements in the second set and through corresponding slots in the elements of the first set.

12. A shaft, an adjustable pulley comprising a fixed conical element mounted on said shaft, a movable conical element disposed on said shaft and adapted to co-operate with said first element to provide a V-shaped peripherally extending groove, each of said elements having a plurality of radially extending slots forming radially extending teeth between said slots, an outer supporting ring securing the outer ends of said teeth, a plurality of comparatively shorter teeth extending inwardly from said supporting ring into said slots respectively, and a plurality of comparatively shorter slots extending inwardly from said supporting ring in said longer teeth respectively.

13. A pulley comprising a first skeletonized cylindrical structure, a second skeletonized cylindrical structure within the first structure and movable axially thereof, each of said structures including longitudinally spaced sets of radially extending teeth with corresponding teeth of adjacent sets spaced from one another at their bases, the teeth of each set being spaced from one another around the periphery of the skeletonized structure.

14. A pulley comprising a first skeletonized cylindrical structure, a second skeletonized cylindrical structure within the first structure and movable axially thereof, each of said structures including longitudinally spaced sets of radially extending teeth, the teeth of each set being spaced from one another around the periphery of the skeletonized structure, the teeth of each set on one of the structures being opposite the spaces between teeth of the corresponding sets on the other structure.

15. A pulley comprising two skeletonized cylindrical structures interlaced and movable longitudinally with respect to one another, a plurality of longitudinally spaced sets of teeth on each of the structures, the corresponding sets on the two structures being opposite one another to form peripheral grooves, and the corresponding teeth of opposite sets being displaced from one another by the width of one tooth.

16. A pulley including a pair of longitudinally spaced coaxial circular members joined rigidly by longitudinal bars extending from member to member to form a unitary structure, said bars being uniformly spaced circumferentially of the members, and teeth secured to the bars and extending radially outwardly of the bars and outwardly of the coaxial circular members.

17. A pulley including a pair of longitudinally spaced coaxial circular members joined by longitudinal bars extending from member to member to form a unitary structure, said bars being uniformly spaced circumferentially of the members, and teeth spaced from one another at their bases secured to the bars and extending radially outwardly of the bars and outwardly of the coaxial circular members, the teeth being identically spaced on all the bars so that corresponding teeth on all the bars form circular rows of teeth.

18. A pulley including a pair of longitudinally spaced coaxial circular members joined by longitudinal bars extending from member to member to form a unitary structure, said bars being uniformly spaced circumferentially of the members, and teeth secured to the bars and extending radially outwardly therefrom with adjacent teeth on the bar spaced from one another at their bases, the teeth being identically spaced on all the bars so that corresponding teeth on all the bars form circular rows of teeth, and fabricated members between the rows of teeth, said fabricated members having slots opposite the respective teeth and having teeth opposite the spaces between teeth of said first mentioned rows.

19. A pulley including a pair of longitudinally spaced coaxial circular members joined by longitudinal bars extending from member to member to form a unitary structure, said bars being uniformly spaced circumferentially of the members, and teeth secured to the bars and extending radially outwardly therefrom with adjacent teeth on a bar spaced from one another at their bases, the teeth being identically spaced on all the bars so that corresponding teeth on all the bars form circular rows of teeth, and fabricated members between the rows of teeth, said fabricated members having slots opposite the respective teeth and having teeth opposite the spaces between teeth 20. A pulley including a pair of longitudinally spaced coaxial circular members joined by longitudinal bars extending from member to member to form a unitary structure, said bars being uniformly spaced circumferentially of the members, and teeth secured to the bars and extending radially outwardly therefrom, the teeth being identically spaced on all the bars so that corresponding teeth on all the bars form circular rows of teeth, fabricated members between the rows of teeth, said fabricated members having slots opposite the respective teeth and having teeth opposite the spaces between teeth of said first mentioned rows, said fabricated members being secured together to form a second unitary structure, said two structures being relatively movable axially of the pulley, and means for adjusting the two structures relative to one another, said means comprising a threaded member having threaded engagement with one of said structures and bearing against the other structure so that upon turning of the threaded member in said one structure it advances the other structure.

21. A pulley including a pair of longitudinally spaced coaxial circular members joined by longitudinal bars extending from member to member to form a unitary structure, said bars being uniformly spaced circumferentially of the members, and teeth secured to the bars and extending radially outwardly therefrom, the teeth being identically spaced on all the bars so that corresponding teeth on all the bars form circular rows of teeth, fabricated members between the rows of teeth, said fabricated members having slots opposite the respective teeth and having teeth opposite the spaces between teeth of said first mentioned rows, said fabricated members being secured together to form a second unitary structure, said two structures being relatively movable axially of the pulley, and means for adjusting the two structures relative to one another, said means comprising a threaded member having threaded engagement with one of said structures and bearing against the other structure so that upon turning of the threaded member in said one structure it advances the other structure, a differential gearing, coupling means between one gear element of the differential and the pulley, coupling means between another gear element of the differential and the threaded member, the driving ratio from the pulley through the differential to the threaded member being such that when a third differential element which couples the two last mentioned gear elements is stationary the threaded member is driven through the differential at exactly the same speed that the pulley rotates, whereby there is no relative turning of the threaded member with respect to either structure.

22. A pulley having a V-shaped belt groove, the two belt receiving sides of the pulley groove having radially extending teeth forming slots between the teeth, the teeth on each side of the pulley groove forming a skeletonized cone, and the belt receiving face of each tooth being rounded out of the conical surface to alleviate the stresses in the belt at the radial edges of each tooth.

23. A pulley comprising means forming at least a part of a cylinder, teeth supported by the cylinder and fixed relative thereto, the teeth being in rows extending lengthwise of the cylinder and the rows being spaced around the circumference of the cylinder with corresponding teeth of the rows in alignment circumferentially of the cylinder, beams extending lengthwise of the cylinder between adjacent rows of teeth, means securing the beams together into one integral structure, said structure and said cylinder being relatively movable longitudinally of the axis of the cylinder, and said beams having teeth cooperating with the first mentioned teeth to form V-shaped pulley grooves.

24. A pulley comprising a ring means, a plurality of spaced parallel bars secured to the ring means to form a slotted cylindrical surface, a row of spaced aligned teeth on each bar and projecting outwardly therefrom, the corresponding teeth on the respective bars being in circumferential alignment, a second set of rows of spaced aligned teeth, each row of the second set of teeth being located between adjacent bars carrying the first mentioned rows of teeth, means securing the second set of rows of teeth into a rigid structure concentric with said ring means, the corresponding teeth of each of the second mentioned rows being in circumferential alignment, adjacent circumferentially aligned groups of teeth forming a plurality of slotted V-shaped pulley grooves, means for relatively moving the said rigid structure and the first mentioned assembled spaced parallel bars with respect to one another axially of the ring means to alter the effective diameter of the pulley grooves.

ALLEN M. ROSSMAN.